United States Patent [19]
Sakarya

[11] Patent Number: 5,349,254
[45] Date of Patent: Sep. 20, 1994

[54] CALL PROGRESS DETECTION CIRCUIT

[75] Inventor: Dursun Sakarya, Dover, N.J.

[73] Assignee: Matsushita Electric Corporation of America, Secaucus, N.J.

[21] Appl. No.: 158,148

[22] Filed: Nov. 24, 1993

Related U.S. Application Data

[63] Continuation-in-part of Ser. No. 926,844, Aug. 6, 1992, abandoned.

[51] Int. Cl.⁵ .............................................. H03D 13/00
[52] U.S. Cl. .................................... 307/525; 307/524; 328/138
[58] Field of Search ...................... 307/522, 524, 358; 328/138, 140

[56] References Cited

U.S. PATENT DOCUMENTS

| | | | |
|---|---|---|---|
| 3,605,029 | 9/1971 | Freedman | 328/140 |
| 3,812,432 | 5/1974 | Hanson | 328/138 |
| 4,215,280 | 7/1980 | Mahig | 307/522 |
| 4,386,239 | 5/1983 | Chien | 308/138 |
| 4,414,517 | 11/1983 | Mahig | 328/138 |
| 4,525,675 | 6/1985 | Richmond et al. | 307/522 |

*Primary Examiner*—John T. Kwon

[57] ABSTRACT

A call progress detection circuit filters the audio input along parallel bandpass and band reject paths. The relevant band of frequencies is defined by the range of 350–620 Hz, within which band all of the call progress tones are found. The energy output from the bandpass path is compared to the energy output from the band reject path to determine if the audio input is generated by a call progress tone or by vocal input.

38 Claims, 8 Drawing Sheets

CALL PROGRESS DETECTION CIRCUIT

This is a continuation-in-part of copending application Ser. No. 07/926,844 filed on Aug. 6, 1992, now abandoned.

The invention relates generally to the monitoring of the progress of a telephone call across a broad range of frequencies. More specifically, call progress circuitry is taught which filters the audio input along parallel bandpass and band reject paths and subsequently compares the outputs to thereby identify the presence or absence of call progress tones.

BACKGROUND OF THE INVENTION

Automatic dialing systems, which have found increasing commercial application in areas such as operator direct sales and the delivery of prerecorded messages, often include detection means with which to monitor the progress of the dialed call. Such detection means must be capable of distinguishing between the call progress tones emitted by a "busy" signal, a dial tone and a ringing telephone and the signals generated by vocal input. Although the range of frequencies for the call progress tones is generally between 350-620 Hz, monitoring the signals is additionally complicated by the fact that human vocal signals can fall within the same frequency range, though seldom would remain at the same frequency throughout a series of successively emitted signals. The various call progress tones have different periods, for example, a "busy" signal tone endures for a brief period followed by a period during which there is, ideally, no detectable signal, whereas a "ring" signal is emitted for a period of longer duration than that of the busy signal and is followed by a longer period during which there is no detectable signal. Call progress circuitry must therefore be equipped to detect, characterize and respond to the variously emitted tones. Call progress detection circuitry must also be readily incorporated into the operating environment, requiring it to be compact. In addition, although there are currently standardized identifiable tones ranges, the established call progress tone frequencies may be varied in the future to accommodate increasingly sophisticated equipment and services. Call progress detection circuitry should also, ideally, be adaptable to new frequency ranges.

In the past, signal filtering systems have been provided to automatic dialing equipment for the monitoring of specific frequencies of incoming call progress signals. A simple detection circuit of the prior art includes a bandpass filter centered on the call progress frequency range of 350-620 Hz. Such a wide range filter will, however, falsely detect voice signals falling within the relevant frequency range. Yet another, more elaborate, call progress detection system includes a series of narrow bandpass filters at each of the relevant frequencies of the known call progress tones, 350, 440 480 and 620 Hz Although the latter filtering system minimizes the possibility of misinterpreting a voice signal as a call progress tone, it is limited in its ability to both receive and correctly identify signals outside of its narrow filter ranges.

All of the prior art circuitry detects call progress signals by the presence of energy in its pass band. Distinguishing between false triggering, such as in the instance of voice signals in the bandpass range, is not possible in such an "either/or" (i.e., energy in the pass band or not) system.

It is therefore an objective of the present invention to provide an improved call progress detection circuit for incorporation with automatic telephone dialing equipment.

It is another objective of the present invention to provide a call progress detection circuit which is capable of detecting and identifying signals in a broad frequency range.

It is yet another objective of the present invention to detect the presence of call progress tones to the exclusion of voice signals in the same frequency range, using more than just the energy in a pass band to detect same.

It is still another objective of the present invention to provide apparatus for distinguishing between call progress tones and human voice signals input to the apparatus.

Yet another objective of the present invention is to provide apparatus for incorporation into an automatic telephone dialing system which is compact.

Still another objective of the present invention is to provide call progress detection apparatus on an integrated circuit chip.

It is a further objective of the invention to provide call progress detection circuitry which can not only detect but also specifically identify the input call progress tone and which is adaptable to newly-established tone frequency ranges.

SUMMARY OF THE INVENTION

These and other objectives are realized by the subject invention wherein parallel bandpass/band reject filtering paths receive and filter the incoming signals and wherein associated circuitry compares the energy from each filter path to determine whether the input signal is a call progress tone or a human voice.

BRIEF DESCRIPTION OF THE DRAWINGS

The invention will be described further herein with specific reference to the drawings wherein.

DETAILED DESCRIPTION OF THE PREFERRED EMBODIMENT

The standardized call progress tones, as noted above, are currently found within the frequency range of 350-620 Hz. Single bandpass filtering systems, which limit the filter to that specific range, can falsely identify voice signals falling within the specific 350-620 Hz frequency range as call progress tones. Although consecutive voice signals would vary in frequency, the single bandpass filtering system is not equipped to respond to instantaneous variations in the frequency, but merely to the presence or absence of energy in the bandpass path. What is taught by the above-reference co-pending patent application is a system which can distinguish a call progress signal from a voice signal. Further characterization of a detected call progress tone as that generated by a dial tone, busy signal, ringing phone or call forwarding system is incorporated into the associated circuitry which is taught and claimed in this application. The equipment which enables the system to react to the detected and characterized signal to thereby respond in kind (i.e., terminate the call if the call progress tone is a busy signal, redial if the tone indicated is a dial tone or continue the call and perhaps count or clock tones in the case of ringing and/or call forwarding signals) is available in the art and is not the subject of the present invention.

Figure 1:
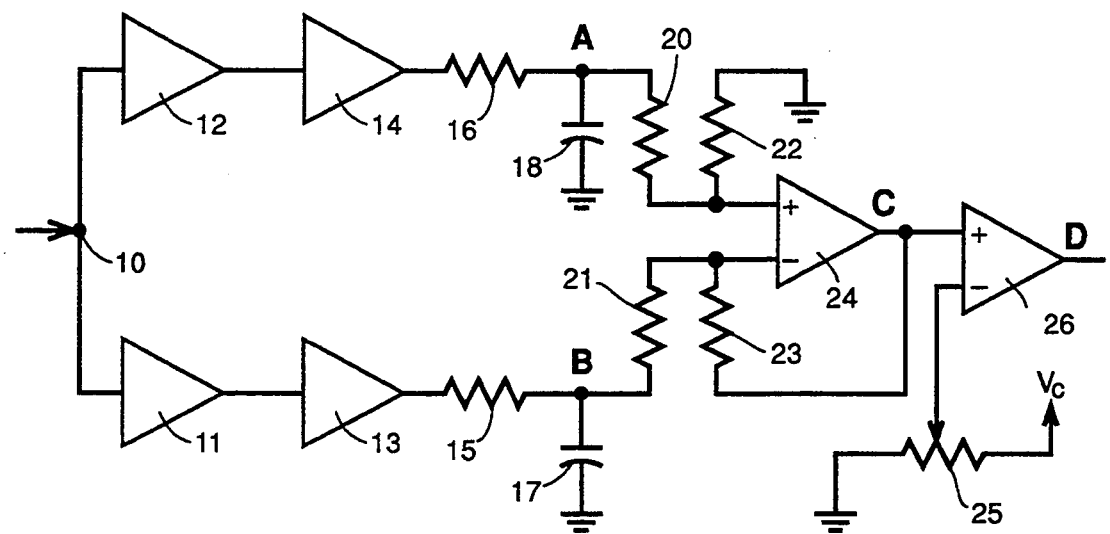
FIG. 1 is a circuit diagram of one embodiment of the inventive call progress detection circuitry.
Figure 2:
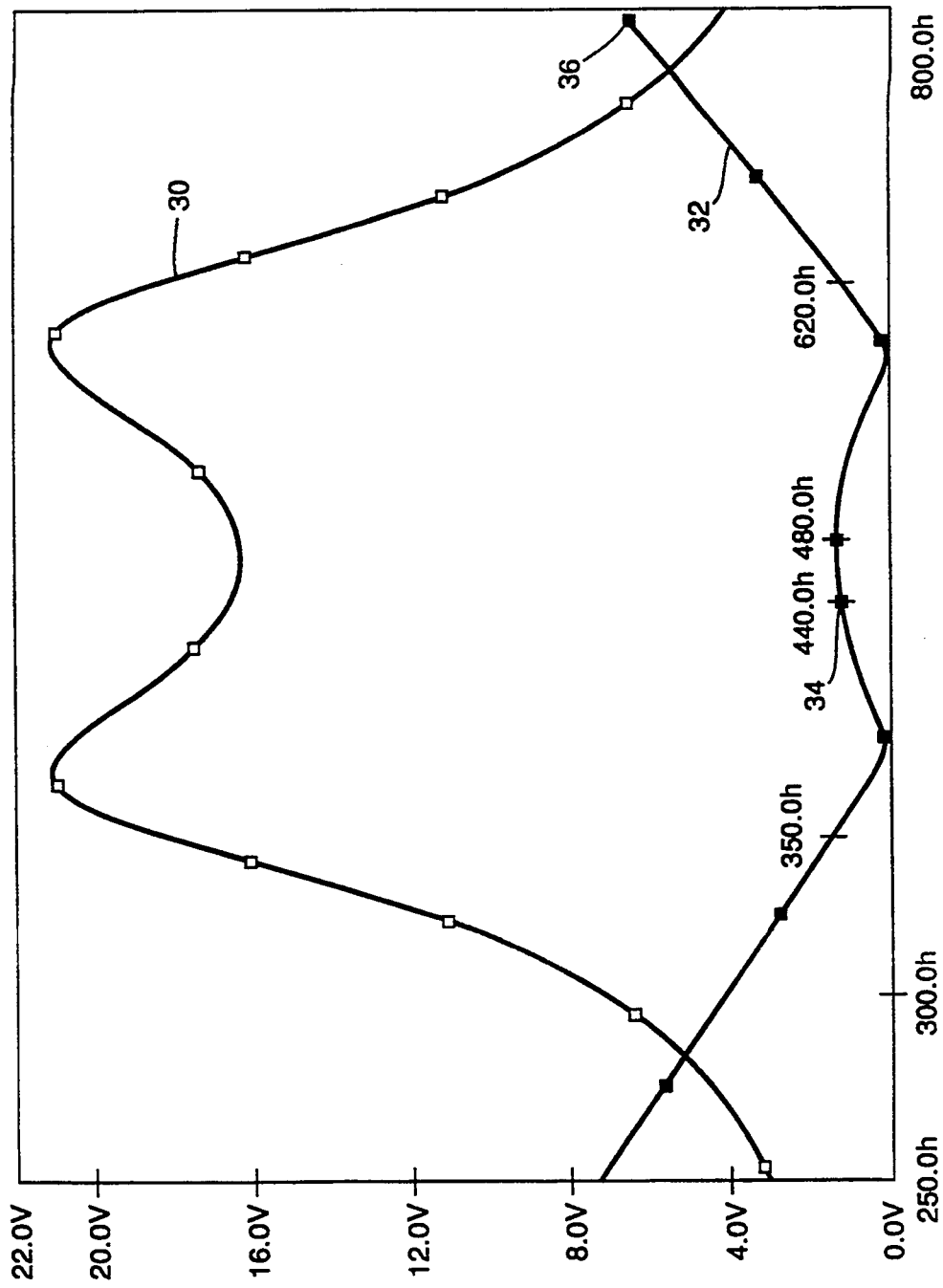
FIG. 2 provides representative output curves for bandpass and band reject filters which could be incorporated into the present invention.

The invention of the above-referenced co-pending patent application includes not only a bandpass filter, at 12 in FIG. 1, having a band width of 350-620 Hz to pass signals in that frequency range, but also a band reject filter, 11, which will reject signals in the 350-620 Hz range and pass signals whose frequencies lie on either side of that range. The human voice can have a frequency range of anywhere from approximately 60 Hz to 20 kHz; but, realistically, the band reject filter need not have a range equal to that of the human voice since most human vocal signals fall in a frequency range from 200 Hz to 3000 Hz. It is, therefore, adequate to incorporate a band reject filter which is capable of passing signals having frequencies from 200-350 Hz and above 620 Hz. Characteristic outputs from bandpass and band reject filters which can be incorporated into the present system are plotted against the relevant frequencies in FIG. 2. In that Figure, curve 30 represents the output of a two pole bandpass filter (such as a Chebyshev filter) having a pass range of 350-620 Hz. As can be observed by the two peaks in the curve, the filter is more responsive at certain frequencies, but generally gives the bandpass capabilities which are desired for the present system. Curve 32 represents the output of a band reject notch filter which has two zero points falling within the 350-620 Hz frequency range. There are countless other filters which can be chosen, for example a notch filter having a single zero point centered within the 350-620 Hz range or a Butterworth filter in the bandpass path, which will give the desired filtering characteristics and which may be preferably chosen over the examples represented in FIG. 2; the critical feature being substantial filtering out of signals below 350 Hz and above 620 Hz for the bandpass path and substantial filtering out of signals within the 350-620 Hz range in the band reject path.

A signal input, at 10, to the circuit proceeds in parallel to the bandpass, 12, and band reject, 11, filters. An input signal having a frequency of 440 Hz, for example, will pass essentially unaffected through bandpass filter 12. The same signal will be rejected at band reject filter 11 and, ideally, there will be no signal at the output of the band reject filter 11. Realistically, some signal will be detectable beyond the band reject filter, as is representatively illustrated at point 34 of FIG. 2; however, the resulting band reject signal will have substantially less energy than the signal which passes through the bandpass filter 12. The bandpass and band reject filters, 12 and 11, are illustrated as amplifiers in FIG. 1 of the preferred embodiment. Such filters as are known in the art and are capable of the required frequency tuning, or filtering, can be readily substituted for the amplifiers illustrated for the system.

Once the signals have been filtered, comparison of the output from the bandpass and band reject filters can be conducted. However, since the signals are still sinusoidally oscillating, and therefore changing both sign and amplitude, it is advantageous to further condition the signals prior to comparing the energy in each of the output signals. Therefore, the signals proceed from filters 12 and 11 to circuit elements 14 and 13, respectively. At circuit elements 14 and 13, the signals are converted from AC to DC signals. Once again, the illustration of the circuit elements specifically as amplifiers is for illustrative purposes only. AC to DC converters can be utilized which do not actually perform any amplification; however, for the present preferred embodiment, it has been found to be advantageous to use amplifiers which provide some gain to an otherwise "lossy" line. Upon AC-to-DC conversion, at the output of 14, at any point in time, one can measure an instantaneous DC representation of the amount of energy "in band". Similarly, at the output of 13, one can obtain an instantaneous DC value for the energy "outband". As noted above, ideally the value at the output of 13 would be zero for a signal which falls within the pass bandwidth of filter 12, and hence in the reject region of filter 11. Absent the perfect filter, however, there will be some detectable energy at the output of the band reject filter and therefore at the output of 13. Clearly, the energy inband, as detected at the output of component 14, will have a much greater value than the outband energy, detected at the output of component 13, for the 440 Hz signal, or any other signal which falls within the specified band pass/reject range.

The DC signals which are output from the AC-to-DC converters at 14 and 13 are no longer changing sign and magnitude sinusoidally as did the input AC signals. However, the amplitude of the DC signal is still continually varying. Therefore, low passing or other averaging of the signal amplitude is desirable in order to obtain a representative value of the energy of each signal. The resistor-capacitor arrangement, 16-to-18 and 15-to-17, illustrates one means for achieving the low pass filtering desired to equalize the energy "inband" and energy "outband" respectively The "averaged" values for the signals, as would be available at points A and B, are then provided for comparison. Averaging or low-passing can be achieved in numerous ways which will be readily apparent to one having skill in the art. Components for providing averaging can be incorporated into the AC-to-DC converter by the inclusion of a capacitor. Yet another implementation of averaging of the signals could be provided in the comparison component itself prior to conducting its comparison of the respective signals.

The signal output from the bandpass path, which for the illustrated example includes bandpass filter 12, ACto-DC converter 14 and low-pass filter arrangement 16-to-18, and the signal output from the band reject path, as illustrated including band reject filter 11, AC-to-DC converter 13 and low-pass filter 15-to-17, are provided to the next circuit component for comparison. In the embodiment illustrated in FIG. 1, the signals are compared in a differential amplifier, 24, with the Band pass output signal applied to the positive input and the band reject output signal applied to the negative input thereof. In effect, the differential amplifier subtracts the value of the energy of the signal from the band reject path of the circuitry, the "outband", from the value of the energy "inband" output from the band pass path of the system. Therefore, the energy which is output to point C (C=A−B) will ideally have a positive value only for those signals which fall within the bandpass range of 350–620 Hz. Necessarily, if the instantaneous energy value of an outband signal at point B, for example from an input voice signal having a frequency of 850 Hz, exceeds the inband energy value at point A, such as is illustrated at point 36 of FIG. 2, then the output of the differential amplifier, 24, at point C will be a negative value. The output of the differential amplifier, 24, can then be applied directly to the call progress characterization circuitry which is associated with the present call progress detection circuitry.

Another means for comparing the energy inband to the energy outband is a divider component, such as the commercially available LH0094 converter manufactured by National Semiconductor. A divider circuit, 27, as incorporated in the system illustrated in FIG. 3 wherein like components are numbered as in FIG. 1, will provide a ratio of the inband to the outband energies at point C' (C'=A/B). Multifunction converters, such as the National Semiconductor product, can perform many functions on signals input to the component at its various input ports. For the sake of simplicity, only two input ports are illustrated. One having skill in the art could connect a multifunction converter or a single function divider to effect the desired comparison of the inband to outband energies. The advantage of using a divider is that its output is the ratio of the energy inband to the energy outband, rather than an absolute value. As an example, if the value of the inband signal A is 4 and the outband signal B is 0.5, the ratio of A:B is 8:1 while the absolute value output by a differential amplifier would be C=3.5; contrasted to if A=8 and B=1, the ratio would still be 8:1 but the absolute value would be C=7. The ratio is more representative of the respective energy and frequency of the input signal and allows easier detection of vocal signals in the bandpass range and easier threshold setting, as discussed further below. Rather than looking for a positive or a negative value at point C, as in FIG. 1, the FIG. 3 circuit will "evaluate" the ratio value from point C'.

As noted above, *ideally* the positive value at point C in FIG. 1, will be indicative of an input signal which is in the frequency range of 350–620 Hz. However, a positive output from the differential amplifier, or a ratio of greater than unity in the FIG. 3 system, indicating greater energy from the pass band than from the reject band path, does not necessarily indicate that there is a call progress tone. It is advantageous, therefore, to provide additional circuitry for comparing the output of the comparison component to a threshold value. As is evident from a review of FIG. 2, the energy output from a bandpass filter, as plotted along curve 30, may be greater than the energy output from the band reject filter, as plotted along curve 32, for a greater range of values than just the 350–620 Hz range. Therefore, a positive value at point C or a ratio of greater than 1:1 at point C', may be representative of an input signal which is not within the relevant range o call progress tone frequencies. For the plotted curves, positive values at point C, or greater than unity values at C', would be "erroneously" detected in the range from approximately 285–350 Hz. With this information, one can establish a threshold value for the output voltage at point C, such that the positive value must have at least the amount of energy which a 350 Hz signal would produce (or the ratio must be as great as that produced by a comparison A:B of a 350 Hz signal). The threshold may be established for other than 350 Hz as the minimum relevant frequency for a call progress tone, depending upon the needs of the system, the potential for line noise altering the output and other factors which would affect both the input signal and the output seen at point C or C'. With respect to signals having input frequencies of greater than 620 Hz, there is again a range of frequencies for which the inband energy will be greater than the outband energy (i.e., from 620 Hz to approximately 800 Hz for a system utilizing the exact filters whose outputs are plotted in FIG. 2). Since curve 30 is symmetrical, and the energy of those signals above 620 Hz is lowering, the threshold circuitry will similarly eliminate those signals which would generate a positive output at point C, or greater than 1 ratio at C', when the input signal is greater than 620 Hz, since the "positive" energy at point C will similarly be below the threshold established at the lower frequency level. The output curves of relevant filters are readily obtainable, so it is a straight-forward modification of the system to eliminate those signals which would otherwise generate "false positive" indications of the presence of call progress tones.

Figure 3:
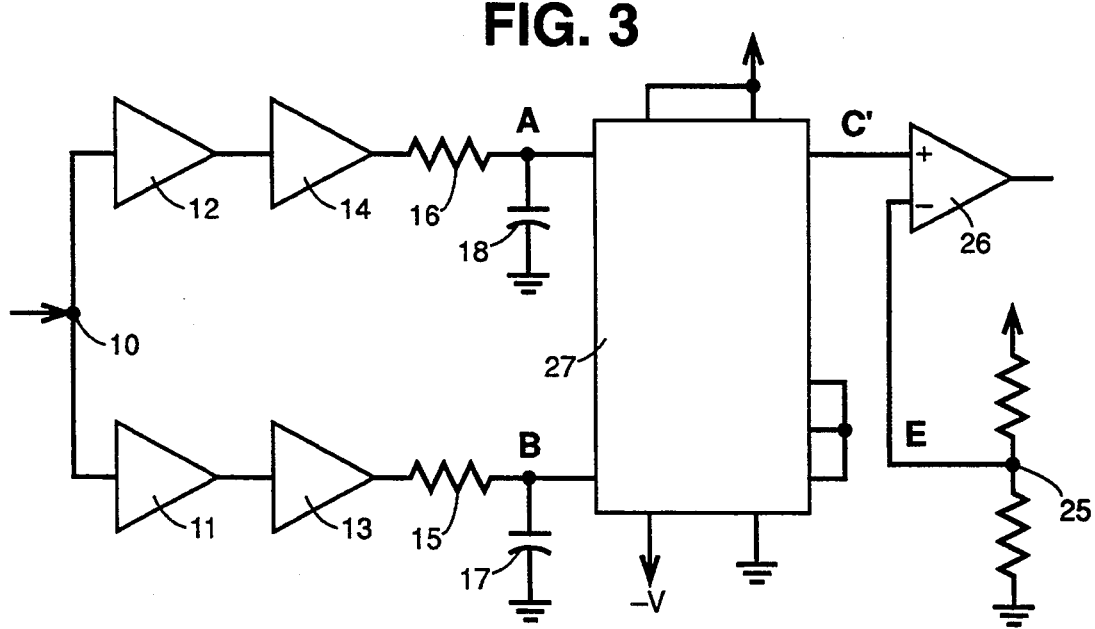
FIG. 3 is a circuit diagram of the inventive call progress detection circuit including a divider circuit for comparing the inband:outband energies.

An example of the threshold circuitry which can be implemented is illustrated as components 25 and 26 in FIGS. 1 and 3. Comparator amplifier 26 and potentiometer 25 provide comparison of the signal output from differential amplifier 24 at point C in FIG. 1 or divider 27 at C' in FIG. 3, to a reference voltage. If there is a negative value at point C in FIG. 1, or a ratio of less than VREF at C', there will be no output at point D and the output of comparator amplifier 26 to go to a value of zero, i.e., ground. In that instance, the system will respond to the fact that there is no output at point D, i.e. no call progress signal detected, with the assumption that the call has been answered and the appropriate response will ensue, presumably either a person will be prompted to answer or a recorded message will be activated. When the output at C, or C', is a value, or ratio, which is less than the threshold voltage, then the output at D goes to ground, i.e. zero. If, however, the value at point C or C' is above the threshold, then output of the comparator amplifier will go to the other state, and there will be a positive output at D, "indicating" to the system that a valid call progress tone has been detected. Further characterization of tile detected call progress signal, such as by classifying by its cadence, can then be performed by associated circuitry.

Figure 4:
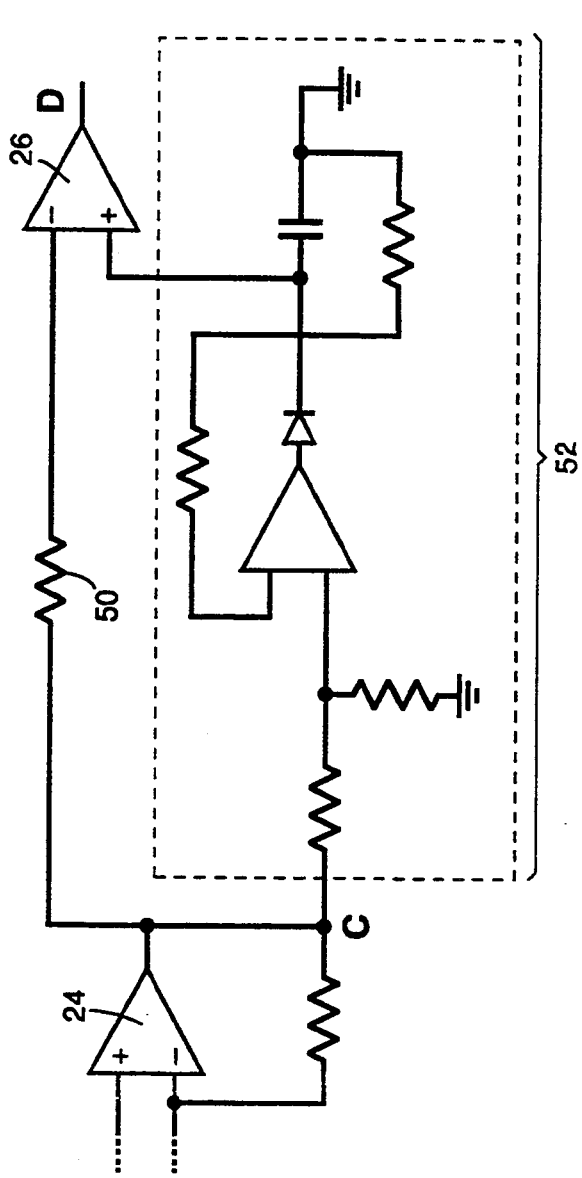
FIG. 4 is a circuit diagram for an implementation of the call progress detection circuit including components for dynamically adjusting the threshold voltage for outputting signals to the associated call progress characterization circuitry.
Figure 5:
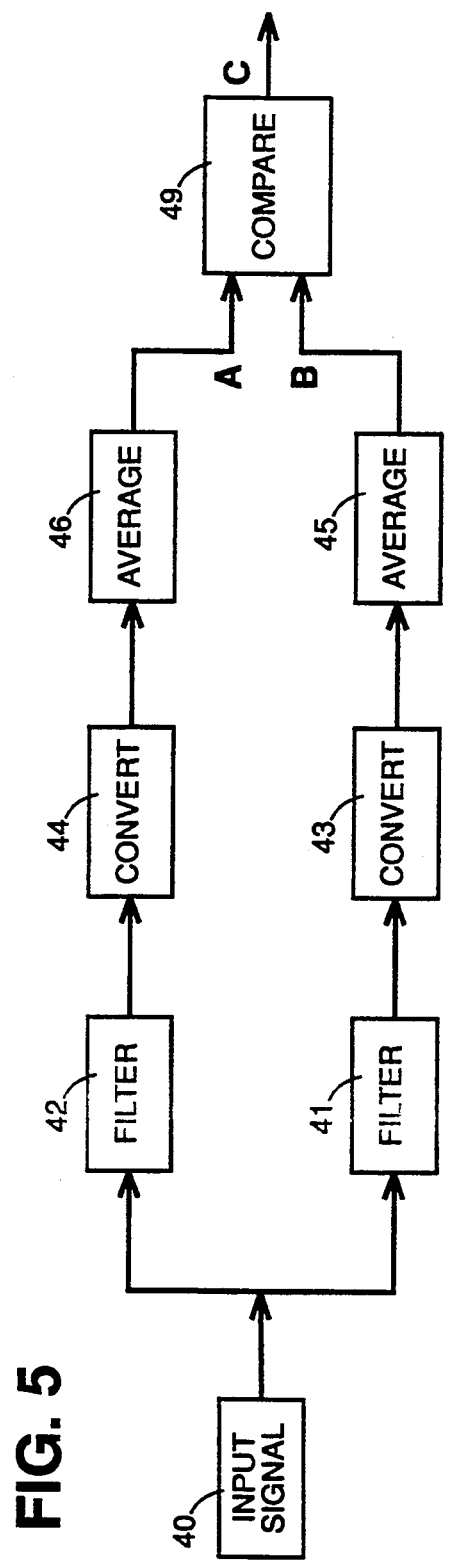
FIG. 5 illustrates the process flow of the call progress detection circuitry of the present invention.

One implementation of the threshold comparator is illustrated in FIG. 4. In the Figure, for the sake of example, point C is labelled at the output of the differential amplifier 24, as in FIG. 1. One could readily incorporate the circuit in the FIG. 3 embodiment. The output is provided to the negative input of comparator amplifier 26 through resistor 50. The output of differential amplifier 24 is simultaneously provided to peak detector circuitry 52 which essentially dynamically sets the reference voltage to be applied to the comparator amplifier 26. The threshold or reference voltage is dynamically adjusted in this manner in relation to the energy of the input signal. The circuitry may be set to provide the reference voltage as one half of the peak value of the inband output, or other value as can be chosen given the needs of the system.

A further enhancement to the inventive circuitry illustrated in FIG. 1 is provided in the trimming of the gain in one or both of the band paths. In operation, when a call progress tone is input to the call progress detection circuitry, the signal will pass through the filter at 12, be converted by the AC-to-DC converter 14, low-pass filtered, or averaged, by resistor 16 to capacitor 18, and passed to the positive input of differential amplifier 24. Simultaneously, the signal is essentially rejected by the band reject filter 11 and any amount of the signal which is output from 11 is converted to DC at 13 and the "average" energy value is provided to the negative input of differential amplifier 24. For a voice signal in the bandpass range, the nominal energy value from point B will be lower than the energy value which is available from point A, but will generally not be proportionally as low as a pure, single frequency signal. As noted above, the energy curves are readily obtained and, therefore, the differential or the ratio of the energy of a single frequency, call progress signal passing through the bandpass path to the energy from the same signal output from the band reject path can readily be established. For the sake of example, a ringing or "ring back" signal, which may be arrived at by the linear combination of 440 and 480 Hz tones or by modulating a 420 Hz tone with a 40 Hz signal is used. Given the Chebyshev filter and noted filter, the bands of which are plotted in FIG. 2, the expected ratios for the energy inband:energy outband ratio for a ring signal might be 12:1. Once the known ratios can be established, it is easier to identify those signals which do not generate such pure ratios. As it is the intent of the call progress detection circuitry to rapidly indicate the need to either respond to a signal which indicates the lack of call progress (i.e., a voice answering the call) or to rapidly characterize call progress tones, then it is desirable to minimize the "effort" with which the call progress signals can be detected or overridden. The threshold of the differential amplifier can advantageously be "tailored" to certain values. As noted above, it is possible that certain vocal signals can fall within the frequency ranges of the bandpass filter, 12, and point A will have a higher value than will point B. If the value of the signal output from the outband path is larger than that from the inband path, then the value at point C, at the output of the differential amplifier, is less than zero (i.e., is a negative value, since B is subtracted from A) for vocal signals outside of the bandpass frequencies. In order to fabricate a system which can respond to the vocal signals in the bandpass range, it may be advantageous to limit the signal going into the differential amplifier from the bandpass path as seen at point A. As illustrated in FIG. 1, the use of a voltage divider (i.e. resistor 22 to ground) trims the gain along the inband path before applying it to the positive input of 24. Limiting the gain will lower the value of the positive input of the differential amplifier, and limit the ratio of the energy at the positive and negative inputs to the comparison component. This lowered value will permit even a relatively low energy value across the outband path to override the inband value, driving C to a negative value in the FIG. 1 embodiment and thus register with the system that no call progress tones have been detected.

In order to define limits to cutting the gain, one can look to the call progress tones of interest and the ratios of the energy inband to the energy outband for the typical call progress tones. The predetermined ratios can be used to adjust the gain of the inband path to thereby limit the energy value to be output at C. One can identify the maximum ratio of inband:outband energies which can be generated with a voice signal, and the minimum call progress ratio which will be encountered, and set the gain trim to the average of the two ratios. The gain trimming along the inband path and/or the outband path are essentially design modifications which will effect greater efficiency in the call progress detection circuitry of FIG. 1, given the needs of the system. If the call progress detection circuitry is to be implemented in a telephone system wherein there is expected to be a great deal of extraneous noise, then it would be imprudent to adjust the system so that point C can be driven to a negative value readily. With reference to the divider circuit embodiment of FIG. 3, gain trim is unnecessary since the output is the ratio. Vocal signals, with more than one frequency or harmonic, will not provide the "pure" ratios of the known call progress tones and will readily be detected by the comparator amplifier's comparison to a threshold value.

In the electronics arena, many different components can be combined with or substituted for other components to achieve a desired function. An example of substitution of various components has been set forth above with reference to the low-passing or averaging of signals by the AC-to-DC converter, a low-pass filter arrangement or the comparison component. The process steps are, therefore, schematically illustrated in FIG. 4 without reference to specific components. One skilled in the art, given the teachings found herein, can readily implement the processes as set forth. The process flow of the invention includes, therefore, the following: providing the input signal at 40 to the inband path and the outband path; filtering the signal at 42 and 41 to pass the relevant frequencies in the inband path and reject the relevant frequencies in the outband path, respectively; converting the AC signals to DC signals at 44 and 43; averaging the signals, schematically illustrated at 46 and 45, although (as noted above) the averaging function may be a part of the preceding conversion step or a subsequent step; and, comparing the inband signal to the outband signal at 49. As further discussed herein, gain trimming may be conducted as a step prior to comparing the voltages, as needed.

A simplified embodiment of the present invention for particular systems includes a low pass filter in the inband path and a high pass filter in the outband path. For telephone applications, there are not many significant signals generated at frequencies below 350 Hz. Moreover, since the band of relevant call progress frequencies is continuous across a low frequency range of up to approximately 620 Hz, a low pass filter will be sufficient to pass all signals in the relevant frequency range for the inband path. Those signals in the 350–620 Hz range will likewise be rejected by a high pass filter in the outband path. The high pass filter need only be "calibrated" to a range above 620 Hz, above which all signals will be passed. From a cost perspective, the more simple filter arrangements are desirable; and, in operation, the low-high pass filter circuit can be equally effective.

Figure 6:
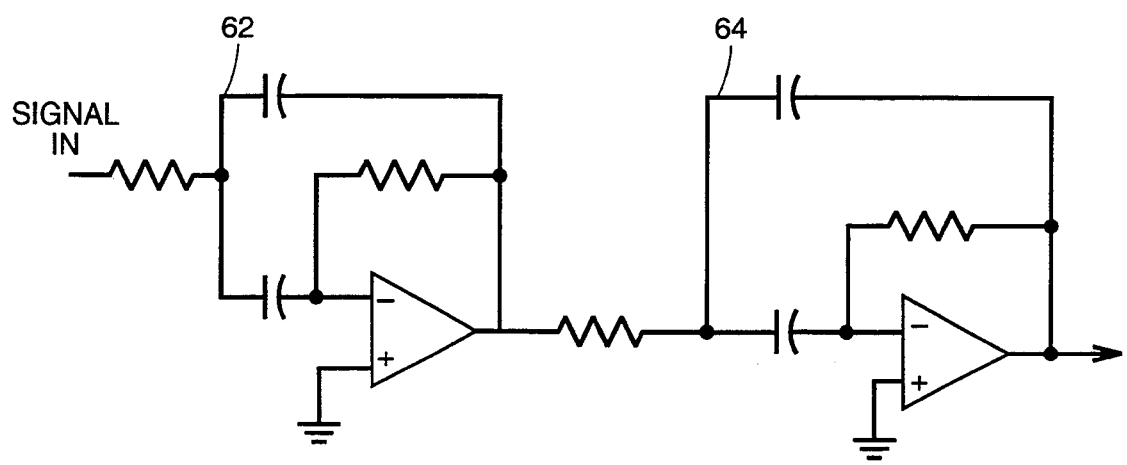
FIG. 6 illustrates a filter comprised of two bandpass filters centered on different frequencies.
Figure 7:
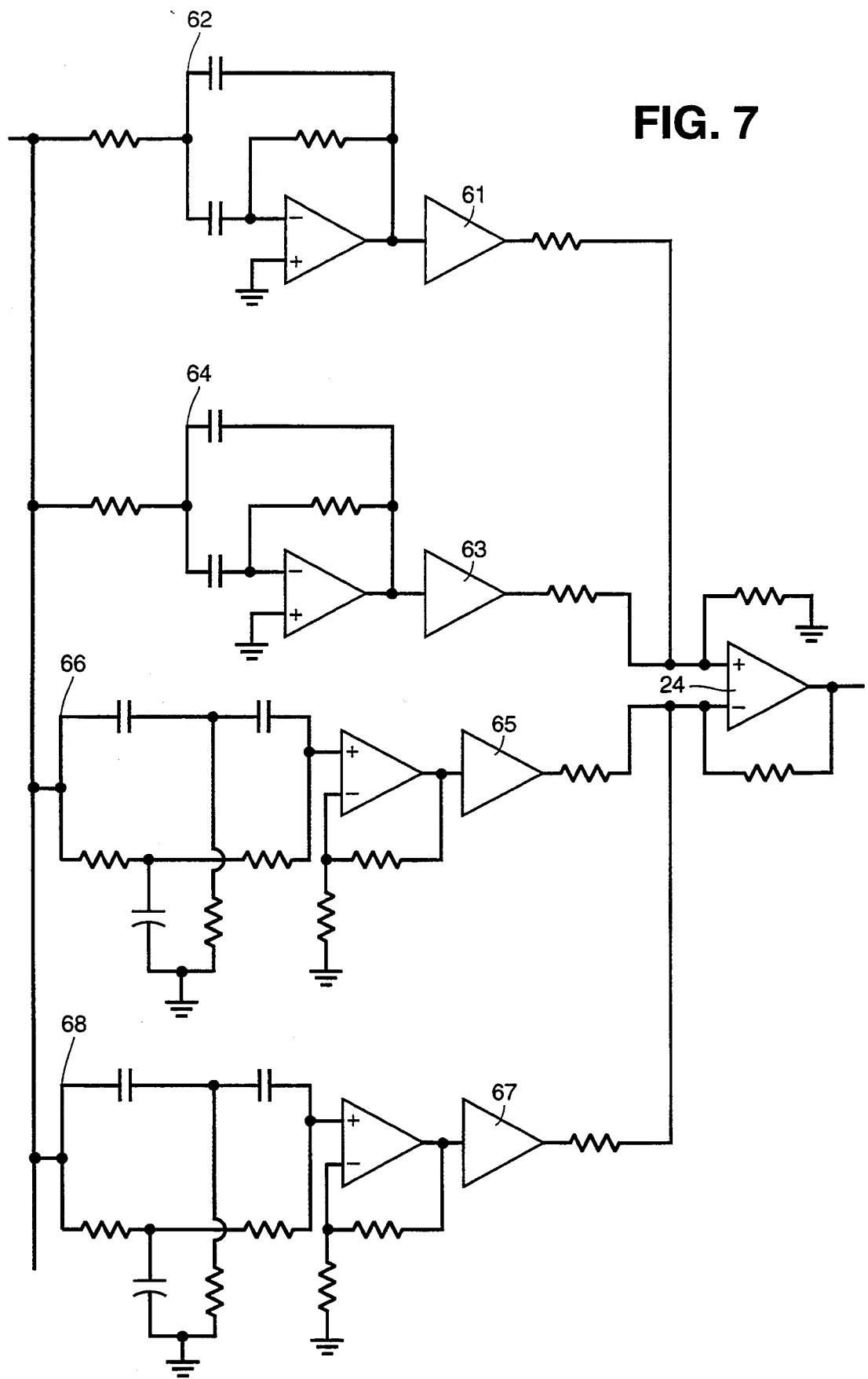
FIG. 7 provides call progress circuitry comprising dual bandpass and band reject paths with outputs provided to the comparator.

As discussed above, the filters 11 and 12 of FIG. 1 can be implemented via various filtering components which are well within the purview of one having skill in the art. FIG. 6 illustrates a typical bandpass filter configuration wherein two identical filters, 62 and 64, having different center frequencies are connected in series to achieve the desired filtering characteristics. For both the bandpass and band reject filters 11 and 12, two filter components could be included along each path. In an alternative embodiment, which is illustrated in FIG. 7, the two components of each of the bandpass and band reject filters are separated from each other. In the embodiment illustrated in FIG. 7, the first bandpass filter 62 and the second bandpass filter 64 are connected in parallel with each other and the DC outputs are both provided to the first input of the comparison circuitry 24. Similarly, the band reject filter 66 is in parallel with the band reject filter 68 and the DC outputs of each band reject path are provided to a second input of the comparison circuitry. The comparison circuitry at 24, as discussed above, may include a differential amplifier or a divider for obtaining either an absolute difference in energy or a ratio of the energy inband to the energy outband.

Figure 8:
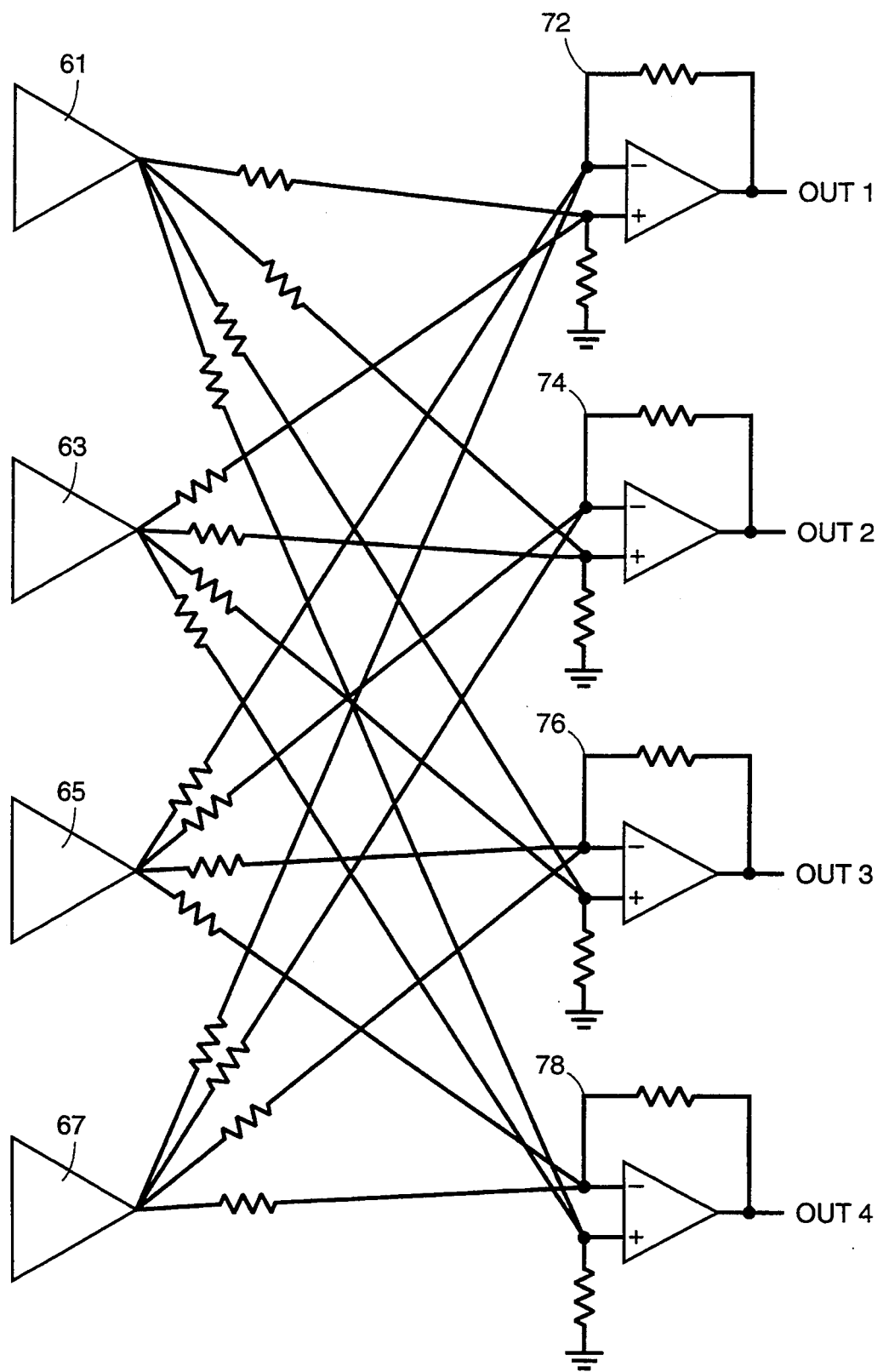
FIG. 8 illustrates multiple comparator circuits for discriminating between multiple filter outputs.

A further advantage of the multiple filter approach is realized when the outputs of the various filters, illustrated in FIG. 8 from the AC-to-DC components, 61, 63, 65 and 67, are provided to a plurality of comparison circuits, 72, 74, 76 and 78. The summing or multiplier/divider comparison circuits can than be used to distinguish among the different call progress tones, for example by providing each comparison circuit with a different frequency threshold which is predetermined to coincide with a particular call progress tone, and/or by connecting the various components of the response circuitry mentioned above (e.g., for generating the appropriate response given the nature of the detected tone) to the different comparison circuits so that only the appropriate one of the connected circuits would be activated by specific comparison results.

Figure 9A:
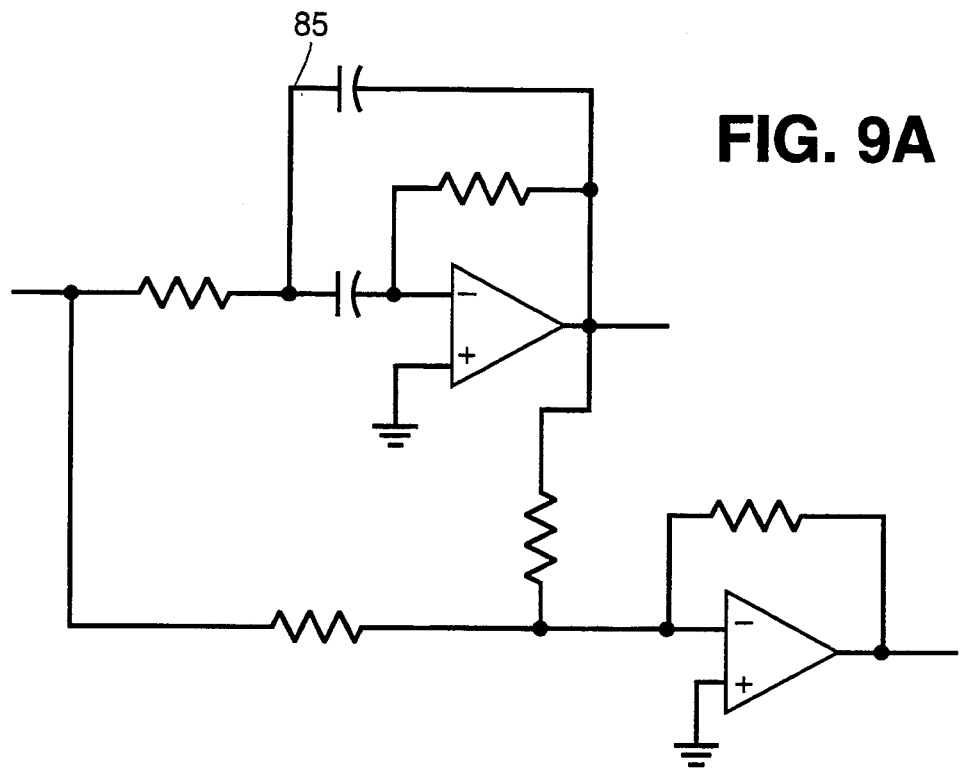
FIGS. 9A and 9B illustrate circuitry and behavior curves for a particular bandpass-notch filter arrangement.
Figure 9B:
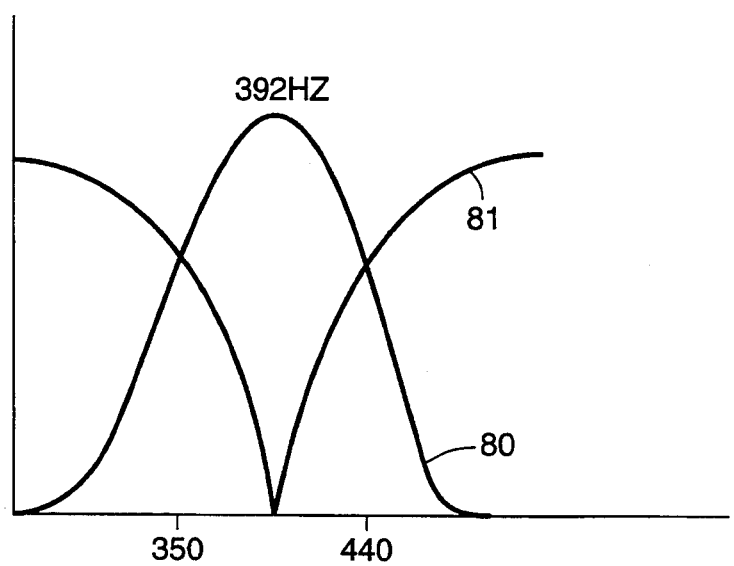

FIGS. 9A and 9B illustrate the circuitry and resultant behavior curves for a particular bandpass/notch filter 85 comprised of a bandpass component and a band reject or notch component. The combined circuitry provides bandpass characteristics, as plotted as curve 80 in FIGS. 9B, coupled with the band notch characteristics, plotted as curve 81 of FIG. 9B, centered about the same center frequency, therein 392 Hz as the relative center point in the range of 350–440 Hz.

Figure 10:
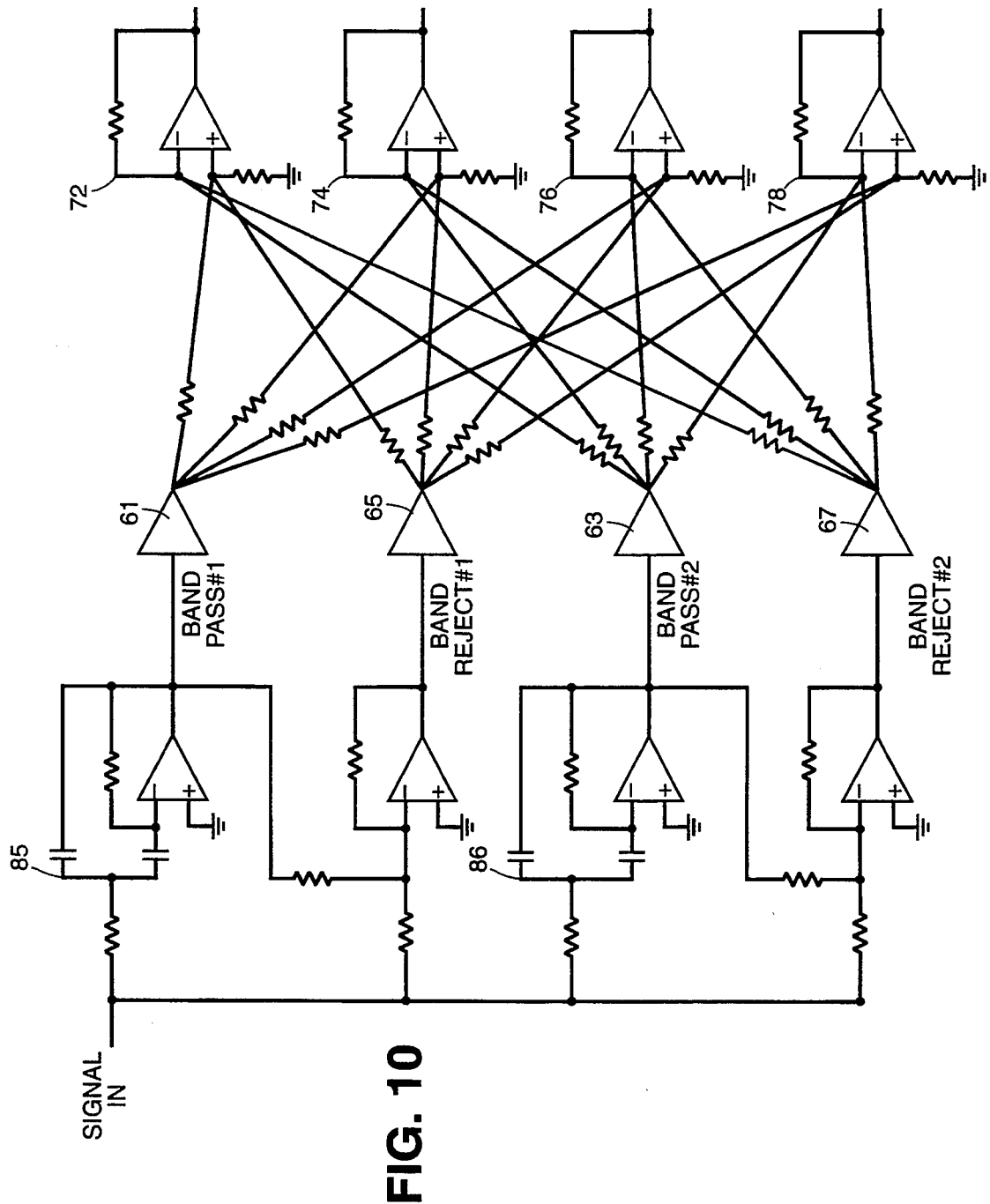
FIG. 10 illustrates call progress circuitry comprising bandpass/notch filter pairs and multiple comparators.

Two such bandpass/notch filters, having different center frequencies for each bandpass/notch paired circuitry, are combined in the call progress circuitry illustrated in FIG. 10. Further multiplication of filter pairs can be conducted for detection and identification of tones in more specific frequency ranges. In the FIG. 10 configuration, one bandpass/notch filter 85 is comprised of a bandpass filter connected to a band notch filter with the center frequency for each segment of the bandpass/notch filters being the same frequency. Similarly, bandpass/notch filter 86 has two segments centered on the same frequency, which frequency is different from that of filter 85. Paralleling the circuit configuration of FIG. 1, the output of each filter component, is provided to the associated circuit element, 61, 65, 63 and 67, for conversion from AC to DC and thereafter through resistors to the inputs of one or a plurality of comparison circuits. The outputs may additionally be averaged as provided for in the earlier-described embodiment.

The signals can be characterized by comparison circuitry comprised of multiple comparison components (including summing or multiplier/divider circuits or reasonable equivalents as discussed above), with each of the comparison components being "taught", or tuned, to respond to a particular frequency or combination of frequencies and which, as illustrated, can effectively distinguish up to $2^4$ separate frequency tones. If new call progress tones are established, or old tones reassigned to different frequency ranges, the circuit coefficients, or weights, can be altered by adjusting resistances in accordance with known technology. Furthermore, secondary comparison circuitry for comparing the outputs to reference voltages can be included. As discussed with reference to FIGS. 1 and 3, the reference voltage thresholds can additionally be dynamically adjusted during use, based upon the input voltages. The foregoing circuitry can not only detect call progress tones, but identify the specific tones and, thence, activate the corresponding response circuitry.

With respect to the operating environment, the present detection circuitry can readily be integrated onto a chip for insertion into a system with minimal space allowance. In fact, given the band pass circuitry which is currently available in the art, it is conceivable that only the band reject filter path and the differential amplifier need by added to a system in order to incorporate the present invention. Such incorporation into an existing system and such other modification, in components, etc., as may be readily apparent to one having skill in the art, are contemplated by the present invention and cannot be undertaken without deviating from the spirit and scope of the present invention as described and claimed herein.

What is claimed is:

1. A signal detection system comprising:
   at least one first filter means for allowing transmission of signals having energy in a first range of frequencies;
   at least one second filter means for allowing transmission of signals having energy which is not is said first range of frequencies;
   means for converting the output of said at least one first and said at least one second filter means from alternating current to direct current; and
   at least one first means for comparing the output of said at least one first filter means to the output of said at least one second filter means.

2. The signal detection system of claim 1 wherein said at least one first means for comparing said outputs of said at least one first and said at least one second filters comprises at least one differential amplifier.

3. The signal detection system of claim 2 wherein the outputs of said at least one first filter means are provided to the positive inputs of said at least one differential amplifier and the outputs of said at least one second filter means are provided to the negative inputs of said at least one differential amplifier.

4. The signal detection system of claim 1 wherein said at least one first filter means comprises at least one low pass filter and wherein said at least one second filter means comprises at least one high pass filter.

5. The signal detection system of claim 1 wherein said at least one means for comparing said outputs of said at least one first and at least one second filters comprises at least one divider circuit.

6. The signal detection system of claim 1 wherein said at least one first filter means comprises at least one bandpass filter having a frequency range of 350–620 Hz.

7. The signal detection system of claim 6 wherein said at least one second filter means comprises at least one band reject filter having a frequency range of 350–620 Hz.

8. The signal detection system of claim 1 further comprising at least one low pass filter means for outputting at least one average energy value for the direct current outputs of said at least one first and said at least one second filter means.

9. The signal detection system of claim 8 wherein said at least one low pass filter means comprises at least one first low pass filter means associated with said at least one first filter means and at least one second low pass filter means associated with said at least one second filter means.

10. The signal detection system of claim 9 further comprising at least one means for trimming the gain on the output of said at least one first low pass filter means.

11. The signal detection system of claim 10 wherein said at least one means for trimming the gain on the output of said at least one first low pass filter comprises at least one voltage divider connected between said at least one first low pass filter means and said at least one means for comparing.

12. The signal detection system of claim 1 wherein said at least one means for converting comprises at least one first means for converting the outputs of said at least one first filter means and at least one second means for converting the outputs of said at least one second filter means.

13. The signal detection system of claim 1 further comprising at least one second means for comparing which compares the output of said at least one first means for comparing to at least one reference voltage.

14. The signal detection system of claim 13 further comprising:
means for dynamically adjusting the at least one reference voltage in proportion to the peak values of the outputs of said at least one first filter means.

15. The signal detection system of claim 1 wherein said at least one first means for comparing comprises at least one multiplier/divider circuit.

16. The signal detection system of claim 1 wherein said range of frequencies comprises the range from 350–620 Hz.

17. The signal detection system of claim 16 wherein said at least one first means for comparing comprises a plurality of comparison circuits each centered about a different frequency in said frequency range.

18. The signal detection system of claim 16 wherein said at least one first filter means comprises a plurality of bandpass filters each centered on a different frequency in said range of frequencies.

19. The signal detection system of claim 16 wherein said at least one second filter means comprises a plurality of notch filters.

20. A method for determining if an input signal is within a range of frequencies comprising:
providing said signal to at least one first filter means having at least one pass band in said range of frequencies;
providing said signal to at least one second filter means having at least one reject band in said range of frequencies;
converting the outputs of said filters to direct current; and
comparing the converted outputs of said at least one first filter means to the converted outputs of said at least one second filter means.

21. The method of claim 20 wherein said providing of said signal to said at least one first and second filters is simultaneous.

22. The method of claim 20 wherein said comparing of the outputs of said filters comprises providing said outputs to at least one differential amplifier.

23. The method of claim 22 wherein said providing comprises:
providing the outputs of said at least one first filter to the positive inputs of said at least one differential amplifier; and
providing the outputs of said at least one second filter to the negative inputs of said at least one differential amplifier.

24. The method of claim 23 further comprising trimming the gain of the outputs of said at least one first filter prior to said comparing.

25. The method of claim 23 further comprising the step of comparing the outputs of said at least one differential amplifier to at least one reference voltage.

26. The method of claim 25 further comprising dynamically adjusting said at least one reference voltage.

27. The method of claim 26 wherein said dynamically adjusting of said at least one reference voltage comprises the steps of:
detecting at least one peak value of the outputs of said at least one first filter means; and
adjusting said at least one reference voltage to a predetermined proportion of said at least one detected peak.

28. The method of claim 22 wherein said comparing comprises the steps of:
combining the converted outputs of said at least one first filter means and providing the combined first output to the positive inputs of said at least one differential amplifier;
combining the converted outputs of said at least one second filter means and providing the combined second output to the negative inputs of said at least one differential amplifier; and
subtracting said combined second output from said combined first output.

29. The method of claim 28 wherein said comparing comprises providing said combined first and second outputs to at least one divider circuit.

30. The method of claim 28 wherein said comparing comprises providing said combined first and said combined second outputs to a plurality of comparison circuits.

31. The method of claim 30 wherein each of said plurality of comparison circuits is centered about a different frequency in said range of frequencies.

32. The method of claim 20 wherein said comparing of the output of said filters comprises providing said outputs to at least one divider circuit.

33. The method of claim 32 further comprising the step of comparing the outputs of said at least one divider circuit to at least one reference voltage.

34. The method of claim 33, further comprising dynamically adjusting said at least one reference voltage.

35. The method of claim 34 wherein said dynamically adjusting of said at least one reference voltage comprises the steps of:
- detecting at least one peak value of the outputs of said at least one first filter means; and
- adjusting said at least one reference voltage to a predetermined proportion of said at least one detected peak.

36. The method of claim 20 further comprising averaging said direct current output prior to said comparing.

37. The method of claim 20 further comprising characterizing the output of said comparing means.

38. The method of claim 20 wherein said comparing comprises the steps of:
- combining the converted outputs of said at least one first filter means;
- combining the converted outputs of said at least one second filter means; and
- comparing the combined first filter outputs to the combined second filter outputs.

* * * * *